Feb. 17, 1953 — J. J. HORAN — 2,628,909
PACKAGING FOR LIQUID INFANT FOOD
Filed Sept. 5, 1947 — 2 SHEETS—SHEET 1
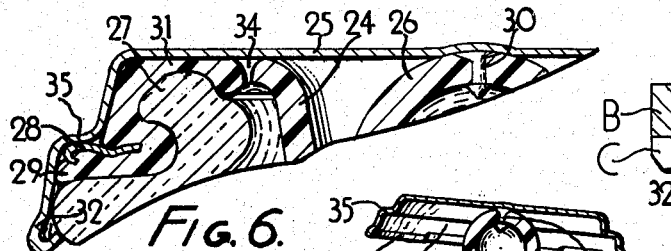
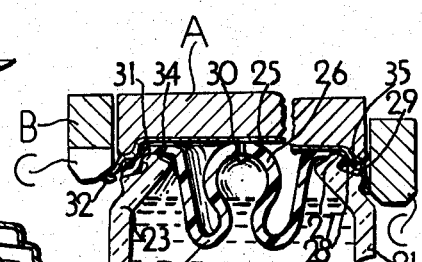
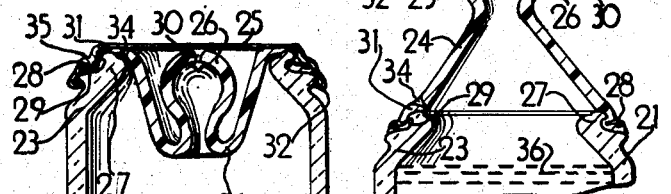
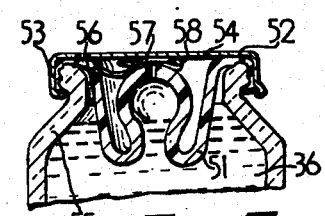
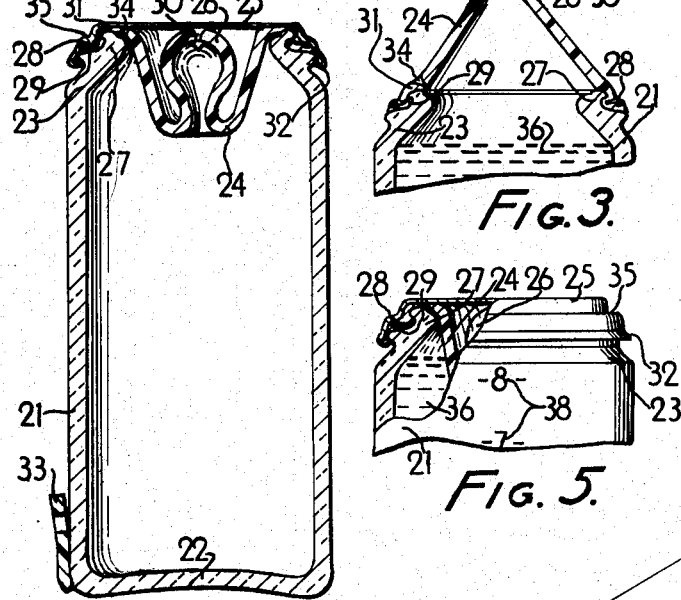
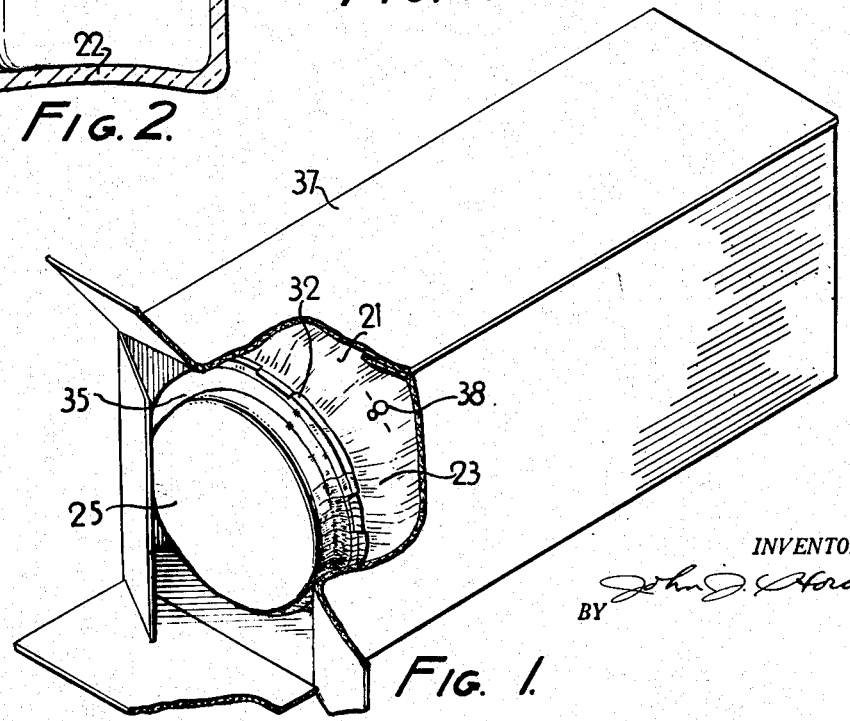
INVENTOR.
John J. Horan
BY Feb. 17, 1953  J. J. HORAN  2,628,909
PACKAGING FOR LIQUID INFANT FOOD
Filed Sept. 5, 1947  2 SHEETS—SHEET 2

INVENTOR.
John J. Horan
BY

Patented Feb. 17, 1953

2,628,909

UNITED STATES PATENT OFFICE 2,628,909

PACKAGING FOR LIQUID INFANT FOOD

John J. Horan, Detroit, Mich.

Application September 5, 1947, Serial No. 772,235

19 Claims. (Cl. 99—171)

This invention relates to methods and devices for packaging liquid infant food for commercial sale. The invention is novel in that it renders possible, at very low unit cost and in large quantities, the practicable production and distribution of packages containing single feeding portions of scientifically balanced liquid infant food, manufactured and processed under strictly controlled factory conditions insuring quality, uniformity, and purity. No intermediate handling, compounding, transferring, or sterilizing by the consumer is involved.

The word "consumer" is used herein to designate a person who purchases the filled packages and administers the contents to an infant. Liquid infant food, as referred to herein, may be milk, milk product, fruit juice or synthesized baby feeding product designed or adapted for feeding to infants through a nipple. The word "processor," herein refers to the dairy, canner, or food processing plant which compounds, processes, pasteurizes or sterilizes, and packages the formula; said compounding, processing, pasteurizing or sterilizing being performed either in the container or previous to filling, the containers also being rendered sterile by the processor.

The word "package" designates the combination of a container having therein a supply of liquid infant food, plus all accessory parts contributing either to sanitary protection or to the convenience of the consumer in feeding an infant. The word "container" signifies the vessel used for holding the formula.

The words "destructive deformation" signify any inelastic distortion, tearing, rupture, change of surface adhesive qualities, breaking, or other damage to any part or bond or juncture between parts resulting from separation of components of the package. It is understood that the separation is accomplished quickly by hand or by simple direct means such as knife, common can opener, or pry tool; and it is not meant to imply that separation without destructive deformation is impossible if special tools or extra precautions, not justifiable economically by the salvage value of the parts, should be employed.

Use of the words "irreplaceable" and "irreplaceably" is similarly limited.

The words "cement" and "cemented" imply optionally the use of surface applied adhesives to secure two or more components to each other, or the use of heat, pressure, or combined heat and pressure to cause softening, melting or flowing of contacting surfaces in such a manner that a bond is created, which bond resists separation of the surfaces so cemented and leakage between them.

The prior art reveals many types of commercial containers adaptable to low cost manufacture in large quantities and capable of carrying solids, semi-solids and liquids. The prior art also reveals many types of nursing bottles, some of which are well suited for home cleaning, sterilizing and re-filling.

However, the means disclosed by the prior art render it necessary for the individual consumer, who naturally desires to feed his baby under sanitary conditions, to perform one or more of the following operations: (1) sterilizing mixing utensils, bottles, nipples, adapters and/or other devices, (2) weighing or measuring and mixing powders, pastes, or liquids with measured amounts of liquids; (3) sterilizing liquid infant food; (4) transferring compounded food to bottles which must be presterilized or be sterilized afterwards by boiling the food in them. Infants are sometimes fed raw milk or milk which has been pasteurized but is seldom germ free at the time of use. Such milk is improperly balanced nutritionally for most infants, so they are thus exposed to the dangers of infection and malnutrition. If the milk is boiled by ordinary means to sterilize it, its nutritional values is further reduced.

The means now provided by the prior art for administering products other than mother's milk to infants give rise to the following hazards among others: (1) danger of lack of sterilization or of improper sterilization of the container, the nipple, or other accessories; (2) danger of lack of sterilization or improper sterilization of the food or of its ingredients; (3) danger of loss of sterility of the food during compounding; (4) danger of overcooking and destroying food value in order to insure sterilization; (5) danger of inaccurately measuring or compounding the food or of omitting one of its ingredients; (6) danger that the consumer may tend to compound the food in overly large quantities in order to reduce the frequency of making up food, thus subjecting it to spoilage; (7) waste of time and food involved in making up small batches; and (8) danger of contamination during or subsequent to preparation, owing to use of inadequate equipment.

This invention includes the following numbered elements functioning in a cooperative manner: (1) A removable outer covering to protect against contamination and dirt during handling and storage, the (2) enclosed container, which is similar to commercial glass containers commonly used for packaging solid and semi-solid foods except for special features which are part of this invention; (3) a supply of pure liquid infant food in the container; (4) a nipple fitted to the mouth of the container, preferably folded to conserve overall height and accessible only when the (5) hermetically sealing means, which may be included in the above removable outer covering, has been removed; (6) a vent for replacing withdrawn food by air, the vent preferably being inoperative until the closure is removed; (7) a removable pin through the feeding orifice of the nipple, or other temporary orifice closure to insure against flooding of the space between the cap and the nipple and to insure that the orifice will not be plugged or blocked by coagulated food, (8) a support for suspending the container in order to permit unattended feeding; (9) graduations to indicate the amount of formula remaining at any time.

Upon opening of these packages, the container and nipple assemblies thereby removable require no supports, brackets, holders or other apparatus, and by themselves serve as complete nursing bottles.

This invention eliminates the present necessity for home compounding, diluting, and sterilizing of various ingredients to make liquid infant food, and eliminates also the laborious, time consuming and uncertainly safe home methods of cleaning and resterilizing bottles, holders, accessories, spoons, utensils, etc., presently required. This invention leaves the consumer with only the duties of opening the package and warming the food to feeding temperature.

Certain practices are adapted from associated prior arts, such as: the use of graduations, presently found in various types of containers, utensils, etc.; an outer covering or wrapper which may, in some cases, be similar to wrappers or boxes used as packages for many types of dry foods, such as crackers, etc.; and certain means for securing a cap, which are adapted in part from securing methods used for containers of solid and semi-solid foods. The forms disclosed reveal new types of nipples, new means of venting, new means of securing nipples, new caps, new convenience and sanitary features such as orifice pins, etc. Even the practices borrowed from associated arts contribute in special combinations to novel utility. I do not waive any rights to the sole use of any of the novel features or co-operative combinations disclosed. Where standard means have been adopted, the purpose has been to demonstrate the applicability to this invention of certain present techniques, machinery, and materials, applicable to economical mass production.

The invention provides a package adapted to be filled, sterilized and sealed by a commercial cannery, food preserving industry, or dairy with infant food which may be dispensed directly without further sterilization or addition of any devices, nipples, etc., which would require separate sterilization, and without compounding or diluting ingredients.

The primary object of this invention is to provide methods by which scientifically balanced liquid infant food in concentrations suitable for direct feeding may be made up in large quantities, purified and packaged under sanitary conditions on modern packaging machinery in portions suitable for single direct feedings without waste, stored, transported, and sold through regular commercial channels, and dispensed directly to infants from the original container.

Another object of this invention is to provide convenient, low cost food dispensing packages suitable for manufacture, filling, and sealing on packaging machinery similar to that now used for commercial packaging of other foods, the packages to afford all possible convenience to the consumer and all possible sanitary protection to the infant.

An object of this invention is to provide nipple bearing closures for containers, the closures being suitable for economical application to containers by industries processing the food for commercial sale.

An object of this invention is to provide processes and methods for the manufacture, processing, storage and sale of formula in hermetically sealed dispensing containers.

An object of this invention is to provide single service protective closures for containers of liquid infant food.

An object of this invention is to provide nipple bearing sealing closures, capable of being assembled to a container in a single operation but permitting quick removal of the sealing elements without removal of the nipple.

An object of this invention is to provide dispensing packages containing liquid infant food at such low cost that all components may economically be thrown away after a single use. I do not desire to limit the application of certain specific parts to single use, since the processor may find it practicable to recover, sterilize and reuse the glass containers herein disclosed, other associated parts being discarded.

An object of this invention is to provide a packaged supply of liquid infant food, which, if tampered with, opened or altered, will reveal the effect of such tampering in the appearance of the package or of its components.

Further objects and novel features of my invention will become apparent in the balance of the specification and in its claims appended. Following are descriptions of several forms thereof as shown in the accompanying drawings in which:

Fig. 1 is a pictorial view of a package in accordance with this invention, the external covering being cut away to reveal the closure and part of the container;

Fig. 2 is a sectional view of the container, less food, with cap and nipple still assembled to it;

Fig. 3 is a partial sectional view after the removal of the cap from the container but before it is finally separated from the nipple;

Fig. 4 is a partial sectional view showing the initial and final positions of dies which may be used in one method of assembly of the nipple bearing closure to the container;

Fig. 5 is a cutaway partial view in which are shown the closure and nipple affixed to the filled container;

Fig. 6 is a fragmentary view in which is shown in enlarged detail the assembly of certain parts to the container;

Fig. 7 is a sectional partial view of an alternative form of container with the cap and nipple assembled;

Figure 8:
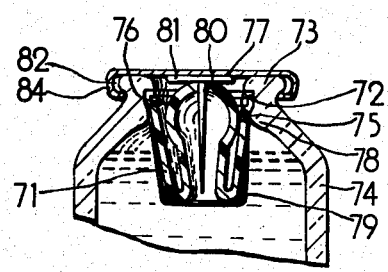
Fig. 8 is a sectioned partial view of a third form of container showing the cap and nipple assembled.

Referring now to Figs. 1, 2, 3, 4, 5, and 6, there is illustrated a package for commercial marketing of liquid infant food in disposable dispensing containers.

The body 21 and base 22 of the container are a glass bottle of conventional method of manufacture, but differing from other containers, particularly in the shape of the mouth 27, which is especially adapted to accommodate the preferred form of nipple construction.

The nipple 24 and cap 25 are assembled as a unit before filling and applying to the container. The nipple 24 is half folded, with the ball 26 nesting within its wall. The squeezer 28, which is preferably, though not necessarily, an annular stamping, may be pressed into the mouth of the cap 25. The nipple 24 is then placed in the cap 25, a simple pressing operation forcing the pin 30, which has preferably been soldered or spotwelded to the cap 25, through the ball 26, thus creating and closing the feeding orifice.

After a supply of food 36 has been placed inside the bottle, the nipple and cap, partly assembled, are dropped over the mouth 27; and the whole is then placed in a closing press which may have cam or double action dies, the latter of which are illustrated.

The central die A squeezes the skirt 31 of the nipple against a seat on the mouth 27 of the bottle at the same time that it flattens the squeezer 28 by pressure transmitted through the step 35 of the cap 25, thus forcing some of the material of the flange 29 of the nipple 24 into the external recess of the bottle mouth 27.

As the central die A reaches the limit of its travel, the ring die B, which has a number of projections with chamfered edges and which has thus far traveled with the central dies A, continues to move downward, each projection forcing a portion of the rolled edge 32 of the cap 25 into the neck recess, as shown in the right hand portion of Fig. 4, so that the cap 25 is secured against removal without distortion of the rolled edge 32. Securing of the rolled edge 32 in this recess will maintain pressure between the cap 25 and the bottle mouth 27 upon the nipple skirt 31, thus providing an effective gripping seal in addition to any vacuum seal afforded by gas pressure differential upon the subsequent cooling of the contents 36.

It is unnecessary that the edge 32 of the cap be secured all around in the neck recess. Indenting of the groove at 4 or more equally spaced points is sufficient for securing the assembly. However, the edge may alternatively be spun so that its rim will lock in the neck recess. A spinning operation or stabbing dies might optionally be used to lock the rolled edge 32 of the cap in the neck recess; also the rolled edge of the cap might optionally be turned outward instead of inward as in the drawing.

The pierced flexible suspension tab 33 is cemented to the body 21 near the base 22 in order to make it possible to suspend the bottle from this tab for unattended feeding.

The external protection 37, shown in Fig. 1, is for the necessary purpose of presenting to the infant a clean container uncontaminated by handling in storage and shipment. If made of paper it should be impregnated and sealed to keep out dirt and foreign matter. In may be of various shapes, a good alternative form being a "Pliofilm" bag.

The consumer strips off the external protection 37, inserts a pry tool, such as a can opener or the back of a knife blade, between the rolled edge 32 and the neck 23, and lifts off the cap 25, pulling the ball 26 of the nipple 24 out to the use position as shown in Fig. 3.

Continued pulling detaches the pin 30 from the ball 26, thus insuring a clean, free sucking orifice for the infant. The vent 34, previously obturated by contact with the cap 25, is freed by removal of the cap 25, permitting the assembly to "breathe" during suckling. The nipple, by virtue of the fact that the squeezer 28 has forced part of the outer flange 29 into the mouth recess, does not come off with the cap 25. In order to insure that only material which has been positively cleaned and sterilized will be in contact with the food, the cap 25 and the nipple 24 are intended not to be reused. The fact that they need be designed for only a single usage is a highly important factor in reducing the cost.

Graduations 38 on the body 21 of the container enable the consumer to see at a glance the amount of formula 36 consumed or remaining after the feeding.

Referring now to Fig. 7, there is shown a package having a simpler alternative closure arrangement in which, as in the previous instance, the skirt 52 of the nipple 51 serves as a gasket and permits both a gripping seal and a vacuum seal.

This closure arrangement eliminates the squeezer previously shown and depends on one or more of the following factors to insure against the outer nipple flange 52 being removed from the container 55 upon disassembly of the cap 54 by the consumer: elastic tension of a stretched flange 53, a cementing or vulcanizing of the flange 52 to the mouth of the container 55, or creep or cold flow of the flange material under stress imposed by the cap 54. It is likewise possible, but more expensive, to mold a tension ring into a nipple flange of slightly different shape, the ring stretching to permit assembly under moderate pressure, but resisting disassembly under the comparatively light pull of the infant.

The nipple feeding orifice 57 and the vent orifice 56 are closed on the exterior faces by a strip 58 of contact adhesive material such as "Scotch" tape, one end of which is folded back over the nipple so as to permit the tacky side to contact the cap 54. The cap 54 is secured in place by stab dies which clinch its rolled edge at four or more points.

After removing an outer protective covering, which may be similar to the covering 37 previously shown, the consumer may warm the inner assembly without opening it if desired. He then pries off the cap 54 with a knife or other tool, and, at the same time, by means of the adhesive strip 58, pulls the nipple 51 up to the use position, freeing both the feeding orifice 57 and the venting orifice 56 so that the infant may now be fed directly.

No external covering has been shown in Fig. 7, the purpose being to eliminate unnecessary duplication, since the protective coverings described for the other two forms are equally suitable for this one.

Figure 9:
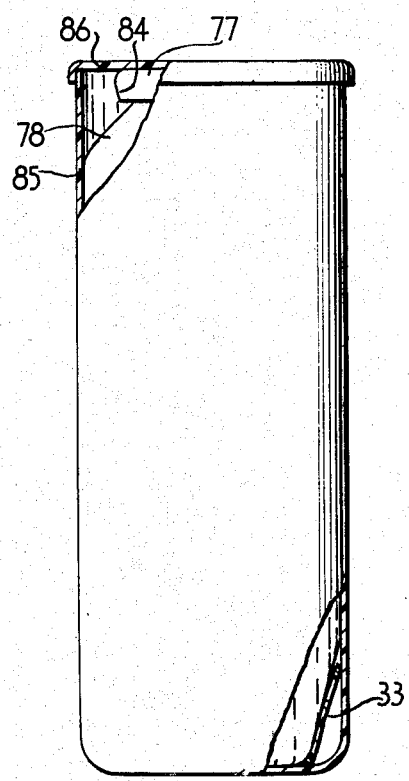
Fig. 9 is a view of a package comprising the filled container and closure assembly, illustrated in Fig. 8, enclosed in a sealed external protective covering.

Referring now to Figs. 8 and 9, there is here illustrated an alternative closure arrangement for a dispenser in accordance with this invention.

This form employs a nipple 71 whose flange 72 is sealed in an internal recess just below the mouth 73 of the container 74.

The flange 72 of the nipple 71 is secured in place by a locking ring 76. The locking ring 76 may be of split construction with abutting ends, of spring steel inwardly stressed by its confinement, or of softer material spun or otherwise permanently stretched in place.

The nipple 71 has a venting orifice 75 adjacent to its flange 72. When the nipple 71 has been assembled to the mouth 73 of the container 74 and the cap 77 has been emplaced, the venting orifice 75 abuts the inner shoulder 78, from which it is physically separated by a thin waterproof cup 79 which separates the entire nipple 71 from contact with either the walls or contents of the container.

The nipple feeding orifice 80 is maintained closed by the broad headed pin 81.

The cap 77 is of conventional cupped design and is fitted with a gasket 82. Upon application of the cap 77, the gasket 82 is squeezed between the exterior surface of the mouth 73 and the cupped side wall 84 of the cap 77, the side wall 84 being stressed by the operation sufficiently to create sealing pressure on the gasket 82. Dislodging of the cap 77 is in part resisted by the slight negative draft of the side wall 84 (accentuated in Fig. 8) and in part by the differential pressure resulting when the contents cool after filling and closing.

The external protective covering, as illustrated in Fig. 8, is a transparent plastic tube 85, closed by a lid 86 cemented over its open end. Of course other types of external covering such as those described elsewhere in this specification would also be adaptable.

The consumer may strip the outer protective covering 85, 86, warm the assembly and pry off the cap 77 by pressure applied under the edge of its side wall 84. Because of the restraining action of the cup 79, the air pressure from outside cannot force the nipple farther inward. The consumer presses the pin 81 downwardly, puncturing the cup 79, and then lifts out the nipple 71 by means of the pin 81, permitting air to rush in through the venting orifice 75 and balance the pressure below the nipple 71. He withdraws the pin completely and then, if he desires, thrusts it through the venting orifice 75, puncturing the cup 79 again, and the dispenser is now ready for the infant.

Figure 10:
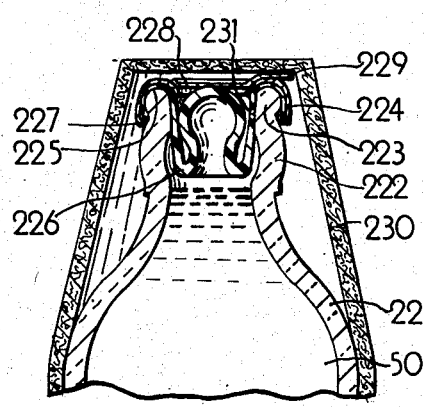
Fig. 10 is a fragmentary view of another form of package in accordance with this invention.
Figure 11:
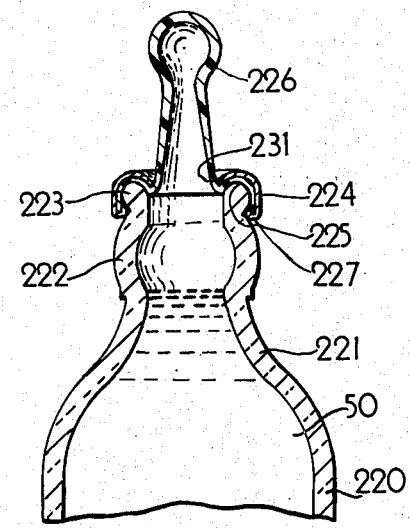
Fig. 11 is a view of the nipple and closure assembly shown in Fig. 10, arranged in the use position.

Referring now to Figs. 10 and 11, there is shown a combination shipping container and nursing bottle having a body 220 preferably made of glass and superficially resembling carbonated water beverage bottles. The body 220 has an integral tapered section 221 reducing the diameter to a neck 223 adapted to be sealed with a cap 224, applied somewhat in the manner of application of caps used on carbonated beverage bottles.

I have shown a distinctive cap 224, the gasket 225 of the cap 224 herein applied being the outer flange 225 of the inner closure or nipple 226 itself. The cap 224 is crimped at its periphery 227 over the extreme edge of the nipple flange, thus providing an air tight gasket for the metallic cap 224.

The upper surfaces of the cap 224 is made slightly reentrant and the center section punched out. An outer closure 228 having a lift tab 229 is set into the reentrant cavity formed in the cap 224 and is soldered or cemented in place. The nipple or inner closure is telescoped and is assembled to the cap 224, the dual closure assembly being then applied to the bottle in one operation.

The wrapper 230 is of orthodox construction and encloses the entire container.

The opening process is simple. A key or pliers is used to pull off the outer closure 228 by means of its tab 229 after the bottle has been warmed and the wrapper 230 removed. Shaking the bottle in an inverted position will cause the weight of liquid inside the bottle to force the nipple 226 out into its use position.

Prior to removal of the outer closure 228, the vent 231, which is located near the flange 225 of the nipple 226, is blocked from operating. After the removal of the outer closure 228 and the outward extension of the nipple 226, the vent 231 is no longer blocked and can fulfil its purpose of admitting air to balance the loss of pressure within the container during suckling.

Although all of the features thus far disclosed cooperate to produce excellent formula dispensers, the elimination of one or more of these features, while lessening the desirability of the product, may under certain conditions not necessarily render the invention inoperative. As an illustration, if the outer covering were eliminated, it would be necessary for the consumer to scald the exterior surface of the container, an additional home operation in which he incurs the hazard of possible breaking of glass containers, if the operation is performed suddenly. Unlike many commercial packages which utilize an outer covering over the container for the purpose of rendering the package more attractive, these containers, which will be handled by infants, must be kept free from all contamination caused by handling during shipment, sale, etc.

The nipple orifice pin or tape may also be dispensed with, particularly if the accessories are assembled to the container under a pressure above atmospheric (preferably with nonoxidizing gas) so that, when the cap is removed, the nipple is forced outward before the gas escapes, the venting and feeding orifices being unplugged of possible coagulation by the escaping gas. In this event it becomes necessary to rely wholly on stress or friction gripping by the cap to provide the sealing pressure instead of a combination of pressure differential plus stress gripping. If pressure differential sealing were relied upon and the orifice pin or tape eliminated from either of the first two forms illustrated, the container could be inverted by the consumer after removal of the cap and the nipple shaken out to the use position where it would stabilize as the event began to function. It is also possible to eliminate both orifices from the nipple as shipped, and to enclose a piercing pin in the space between the nipple and cap, so as to eliminate the necessity for the consumer to sterilize a tool with which to perform the operation of piercing himself.

The fact that a screw off type of cap might be used instead of the pry off type preferred is, of course, obvious.

The nipple need not necessarily be folded, the advantage of folding or telescoped nipples being that they permit a reduction in overall height and resultant economy in the manufacture of the bottle and cap.

It is also possible to combine in one article of merchandise, features appearing in different forms illustrated in the drawings, as for example: To employ a nipple whose outer flange fits over the mouth of the container as in Figs. 1 through 7, and to provide a separate gasket for sealing as in Fig. 8, the gasket seating between the inner wall of a cap drawn somewhat deeper than that shown in Fig. 8 and a beaded external surface farther removed from the mouth of the container than the rim, over which the nipple flange fits. This is one of a number of equivalent constructions within the scope of this invention.

It is not essential that the caps be assembled to the containers by means of dies. The rolled edges of the caps in the first two forms illustrated may, for instance, be preindented so that the caps may be screwed into place over containers the surfaces of whose neck grooves are pitched at an angle.

The containers shown may be sterilized, filled, and assembled cheaply at the processor's plant by methods and machinery similar to that currently used for manufacture and filling of containers widely used by the canned goods industries. Certain additions to and modifications of these methods and machinery are necessary, particularly for providing the outer covering and the nipple; but the tooling and labor required and the extra materials are relatively inexpensive when compared with the overall cost of processing, packaging, handling and shipping.

All of the forms shown are disposable, in that the cost of collecting, cleaning, repairing and preparing parts for reuse would normally be greater than the extremely low first cost of the parts. It is conceivable that the glass containers alone might practically be salvaged and cleaned for reuse according to present practice with milk bottles; but this is not considered an important object; and it is felt that the formula will be more generally acceptable if presented in brand new containers.

The packages shown are not adaptable to complete disassembly, cleaning, reassembly, and repeated reuse for the same purpose without replacement or resealing of some parts, differing in this respect from nursing bottles as heretofore known. In every case at least 2 parts, including the outer covering and generally the cap, either depend for their performance upon the fact that they are deformed, stressed, soldered, or cemented to provide a competent closure or are susceptible of being rendered unfit for permitting their reuse by the normal opening operation performed by the consumer. Even if, through use of extra care, certain types of closures may be uneconomical.

The manufacturing steps above are individually conventional in the sense that conventional techniques such as glass blowing, die work, etc., are utilized in the manufacture of the several novel components and the novel product. The combination and sequence, and similar combinations and sequences are considered to be part of this invention.

Processing cows milk into sterile nutritionally balanced liquid infant food in a continuous series of steps under scientifically controlled conditions was heretofore impracticable, because of lack of marketability. Processors have generally aimed at producing dehydrated formulas packaged as powders or thick liquids, making it necessary for the consumer to perform other operations in the home. Some of the nutritional elements which would otherwise remain present are irrevocably damaged by the dehydrating processes; and many physicians, realizing the limitations of dehydrated infant foods, have recommended such substitutes as mixtures of ordinary evaporated milk, corn syrup, and water for infants who are denied natural mothers' milk.

While there have been shown and described what are at present considered to be the preferred forms and process of this invention, it will be obvious to those skilled in the art that various changes, modifications and combinations may be made therein without departing from the true scope of this invention; and it is accordingly intended, in the appended claims, to cover such equivalents as may fall within the true scope of this invention and without the prior art. Therefore, I claim:

1. As an accessory for an open mouthed container, said container having an external groove adjacent to its mouth and second groove further removed from said mouth and separated from said first mentioned groove by a shoulder, said container having a supply of liquid infant food therein and having attached a nipple whose skirt extends over said mouth, said nipple having a peripheral portion secured in said first mentioned groove, a closure having a generally flat and circular central portion and a cupped sidewall, said closure having been placed over said mouth of said container, said nipple being interposed between said closure and said mouth, said cupped sidewall extending axially beyond said peripheral portion and said shoulder to a point opposite said second mentioned groove, said sidewall having been thereupon bent beyond the yield stress of the cap material inwardly into said second mentioned groove, said sidewall thus deformed thereupon bearing upon the underside of said shoulder and holding said cap firmly in place upon said container, the said flat circular portion of said cap squeezing said skirt against said mouth of said container, thereby forming an airtight seal.

2. The combination of a container having a recess in its inner wall adjacent the mouth thereof, and an insert closure having its periphery engaged in said recess, said insert closure having nipple means therewith.

3. An article of manufacture including a compartment having a supply of liquid infant food therein, said compartment including a member having a comparatively weakly held element at the top tip thereof, said member being adapted to function as a nursing nipple when said element is removed to prepare a sucking aperture.

4. An article of manufacture including a compartment having a supply of liquid infant food enclosed therein, said compartment including a member having a comparatively weakly held element at the tip thereof, said member being adapted to function as a nursing nipple when said element is removed to prepare a sucking aperture, said element having a projection thereon to facilitate its removal.

5. A package for commerce comprising: a container, said container enclosing a supply of liquid infant food; an inner closure spanning the mouth of said container, said inner closure including nipple means, said nipple means having an orifice therein; and an outer closure, said outer closure in cooperation with said container forming a compartment for housing said food and said nipple means, said nipple means having thereto attached at said orifice a sealing member, said sealing member being adapted to be pulled free of and to unblock said orifice when said closure has been detached from said container.

6. A package for commerce comprising: a container, said container enclosing a supply of liquid infant food; an inner closure spanning the mouth of said container, said inner closure comprising reentrant nipple means, said nipple means having an orifice; and an outer closure, said closures in cooperation with said container forming an airtight compartment, said nipple means having therewith a lifting element adapted to erect said nipple means and to be itself withdrawn therefrom.

7. A package for commerce comprising: a container holding therein a supply of liquid infant food; an inner closure spanning the mouth of said container, said inner closure comprising nipple means; and an outer closure, said closures in cooperation with said container forming a compartment for housing said food and said nipple means, said outer closure having been greatly stressed at assembly to said container, said outer closure, therefore, exerting gripping force upon said container sufficient to resist efforts to remove said outer closure by the unaided hand without inelastic distortion to said outer closure and without inelastic distortion to said container.

8. A package for commerce comprising: a container having therein a supply of liquid infant food; a nipple spanning the mouth of said container; and outer closure means external to said nipple and likewise spanning said mouth, said outer closure means having a central portion and an annular portion and a weak juncture between said named portions, said central portion being initially removable by force at said weak juncture, said juncture being thereby destroyed.

9. A package for commerce comprising: a container holding a supply of liquid infant food therein; an inner closure spanning the mouth of said container, said inner closure comprising nipple means; and an outer closure, said closures in cooperation with said container forming a compartment for housing said food and said nipple means, said compartment generally but not necessarily being under pressure other than normal atmospheric pressure, whereby a differential pressure may exist, said outer closure having been stressed in place, said outer closure gripping said container with a force sufficient at normal environmental temperatures, whether supplemented or opposed by said differential pressure, to resist efforts to remove said outer closure from the said container without inelastic distortion to the said outer closure and without inelastic distortion to said container.

10. A package as in claim 9, the said compartment being enclosed within a water resistant enclosure.

11. A package as in claim 9, the said package incorporating means for preventing successive disassembly and reassembly of said complete package by the unaided hand without resort to extraneous means.

12. A package as in claim 9, the said package having been inelastically altered after the admission of said food.

13. A package as in claim 9, said package including a member interposed between said nipple means and said food, said member preventing said nipple means from initial contact with said food, said member capable of being disabled.

14. A package comprising: a container, said container enclosing a supply of liquid infant food; an inner closure spanning the mouth of said container, said inner closure comprising nipple means, said nipple means having an orifice; and an outer closure, said outer closure in cooperation with said container forming a compartment for housing said food and said nipple means, said outer closure and said container in cooperation confining said orifice between their abutting surfaces so that no fluid can pass through said orifice until said outer closure has been removed.

15. A package comprising: a container, said container enclosing a supply of liquid infant food, said container having a recess in the wall adjacent its mouth; an inner closure spanning said mouth, said inner closure including nipple means, said inner closure having a peripheral portion engaged in said recess; a locking member confining said peripheral portion in said recess; and an outer closure, said outer closure in cooperation with said container forming a compartment for housing said food and said nipple means.

16. A package as in claim 7, said container having a projection therefrom at the end opposite said mouth, said projection having suspension means therein.

17. A package as in claim 9, said container having a projection therefrom at the end opposite said mouth, said projection having suspension means therein.

18. A package comprising: a container having therein a supply of liquid infant food, said container having an opening at one end thereof, said opening being spanned by nipple means; a piercing device for said nipple means; and an external closure hermetically sealed to said container, said external closure and said container in cooperation forming a germ-proof enclosure housing said food, said nipple means and said piercing device.

19. A package comprising: a container having a supply of liquid infant food therein; a nipple spanning the mouth of said container; a closure external to said nipple and likewise spanning said mouth, said closure having a weak juncture therein incorporated; and a projection from said closure, whereby, when said projection is pulled away from said closure, said weak juncture becomes overstressed and said closure fails at said weak juncture.

JOHN J. HORAN.

REFERENCES CITED

The following references are of record in the file of this patent:

UNITED STATES PATENTS

| Number | Name | Date |
|---|---|---|
| 146,129 | Fry | Jan. 6, 1874 |
| 1,100,433 | Johnson | June 16, 1914 |
| 1,344,760 | Goddard | June 29, 1920 |
| 1,418,268 | Alvey | June 6, 1922 |
| 1,425,532 | Marr | Aug. 15, 1922 |
| 1,429,585 | Hagerty | Sept. 19, 1922 |
| 1,508,155 | Berg | Sept. 9, 1924 |
| 1,623,544 | Kushner | Apr. 5, 1927 |
| 1,733,184 | Decker | Oct. 29, 1929 |
| 1,749,313 | Burtchaell | Mar. 4, 1930 |
| 2,090,749 | Corsi et al. | Aug. 24, 1937 |
| 2,093,130 | Kurkjian | Sept. 14, 1937 |
| 2,438,299 | Relis | Mar. 23, 1948 |

FOREIGN PATENTS

| Number | Country | Date |
|---|---|---|
| 13,588 | Great Britain | 1907 |